(12) United States Patent
Jeuk et al.

(10) Patent No.: US 11,716,282 B2
(45) Date of Patent: Aug. 1, 2023

(54) SYSTEM AND METHOD OF PROVIDING SEGMENT ROUTING AS A SERVICE

(71) Applicant: Cisco Technology, Inc., San Jose, CA (US)

(72) Inventors: Sebastian Jeuk, Munich (DE); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/686,577

(22) Filed: Mar. 4, 2022

(65) Prior Publication Data

US 2022/0311709 A1    Sep. 29, 2022

Related U.S. Application Data

(63) Continuation of application No. 16/915,657, filed on Jun. 29, 2020, now Pat. No. 11,283,712, which is a (Continued)

(51) Int. Cl.
*H04L 45/64* (2022.01)
*H04L 45/42* (2022.01)
(Continued)

(52) U.S. Cl.
CPC ............. *H04L 45/64* (2013.01); *H04L 45/12* (2013.01); *H04L 45/42* (2013.01); *H04L 47/2425* (2013.01)

(58) Field of Classification Search
None
See application file for complete search history.

(56) References Cited

U.S. PATENT DOCUMENTS 9,215,164 B2    12/2015 Scharf et al.
10,476,738 B1 *  11/2019 Sharifi Mehr ........ H04L 43/062
(Continued)

FOREIGN PATENT DOCUMENTS

EP         2249525 A1    11/2010
WO   WO-2013184846 A1 * 12/2013 ............ G06F 11/008

OTHER PUBLICATIONS

Communication pursuant to Article 94(3) EPC from the European Patent Office, dated Feb. 11, 2019, 9 pages, for the corresponding European Patent Application No. 17181900.6.

(Continued)

*Primary Examiner* — Jeffrey R Swearingen
(74) *Attorney, Agent, or Firm* — Polsinelli

(57) ABSTRACT

Disclosed is a system and method of providing a segment routing as a service application. The method includes receiving a configuration of an internet protocol environment. The configuration can be a layer 3 configuration of a single cloud environment or even across multiple cloud environments. The configuration defines routing, forwarding, and paths in the environment between different entities such as virtual machines. The method includes receiving a parameter associated with a workload of a tenant. The parameter can be a service level agreement (i.e., a best bandwidth available), a pathway requirement, a parameter associated with specific workload, and so forth. Based on the configuration and the parameter, the method includes generating tenant-defined layer 3 overlay segment routing rules that define how the workload of the tenant will route data in the internet protocol environment using segment routing.

49 Claims, 3 Drawing Sheets

Related U.S. Application Data continuation of application No. 15/216,653, filed on Jul. 21, 2016, now Pat. No. 10,708,183.

(51) Int. Cl.
*H04L 47/2425* (2022.01)
*H04L 45/12* (2022.01)

(56) References Cited

U.S. PATENT DOCUMENTS

| | | | |
|---|---|---|---|
| 11,520,618 B2* | 12/2022 | Pyasetskyy | G06F 9/466 |
| 2004/0213221 A1 | 10/2004 | Civanlar et al. | |
| 2015/0036480 A1 | 2/2015 | Huang et al. | |
| 2016/0006794 A1* | 1/2016 | Acosta Amador | H04L 67/30 709/202 |

OTHER PUBLICATIONS

Extended European Search Report from the European Patent Office for the corresponding EP Application No. 17181900.6, completion date, Oct. 26, 2017, 13 pages.

* cited by examiner

SYSTEM AND METHOD OF PROVIDING SEGMENT ROUTING AS A SERVICE

CROSS-REFERENCE TO RELATED APPLICATION

This application is a Continuation of U.S. Non-Provisional patent application Ser. No. 16/915,657, filed Jun. 29, 2020 which in turn, is a continuation of U.S. Non-Provisional patent application Ser. No. 15/216,653, now U.S. Pat. No. 10,708,183, the contents of which are incorporated herein by reference in their entirety.

TECHNICAL FIELD

The present disclosure relates to segment routing and more specifically to a tenant-defined layer 3 segment routing overlay that defines routing paths for a workload of the tenant.

BACKGROUND

Typically, traffic routing in a cloud environment is defined by the cloud provider. The workload submitted to the cloud environment by tenants has to adhere to the underlying IP connectivity. However, with dynamic workloads in tenant environments, often the prescribed traffic routing for any particular workload may not be optimal. The traffic routing rules in place, for example, may not match very well the needs of the workload. The mis-match between routing rules defined by the service or cloud provider and the functionality of the actual workload reduces the efficiency of the cloud environment and can increase frustration on the part of the tenant and their cloud provider as well.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

Overview

Figure 1:
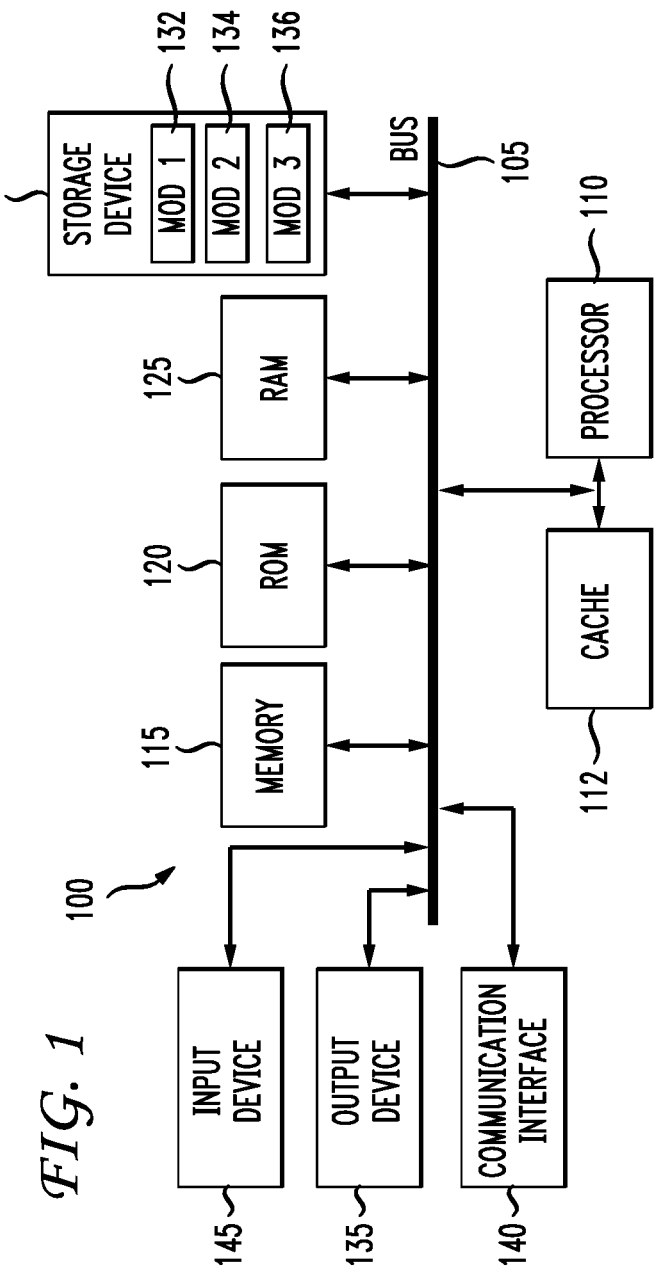
FIG. 1 illustrates the basic computing components of a computing device according to an aspect of this disclosure.

It is a widely recognized (and often frustrating) fact that there is a lack of tenant-specific routing capabilities in cloud environments. As noted above, when the cloud environment management system imposes routing and pathway requirements on tenants and their workload, inefficiencies can result. There is an ever-increasing need to address these issues and to be able to define routing on a per-tenant or a per-workload basis. Each tenant needs to be able to define their routing environment based on application requirements. The concepts disclosed herein address the issues in the art and solve these problems in a simple, but novel, manner. In addition, tenant applications should be able to modify routing in real time, on-demand, dynamically and in an automated fashion.

Disclosed is a system and method of providing a segment routing as a service application. Segment routing is used to abstract the routing from the IP addresses and use the concepts of segments to do route forwarding. The concepts disclosed herein involve using segments as the basis for making decisions about how to reach a destination in a network pathway. The segment routing as a service (SRaaS) disclosed herein is an application running on a cloud device that provides application programming interfaces (APIs) to achieve a more flexible and beneficial approach to managing routing using segments. By using SRaaS, the system can modify the segment routing environment depending on what the tenant needs for a particular workload.

The method includes receiving a configuration of an internet protocol environment. The configuration can be a layer 3 (i.e., network layer of OSI model) configuration of a single cloud environment or the configuration can cover multiple cloud environments. The configuration defines routing, forwarding, and paths in the environment between different entities such as virtual machines. The method includes receiving a parameter associated with a workload of a tenant. The parameter can be a service level agreement (i.e., a best bandwidth available), a pathway requirement, a parameter associated with specific workload, and so forth. Based on the configuration and the parameter, the method includes generating tenant-defined layer 3 overlay segment routing rules that define how the workload of the tenant will route data in the internet protocol environment using segment routing. The generation of the tenant-defined layer 3 overlay segment routing rules can include modifying a current set of rules, which can be implemented by the cloud environment or be a previous set of tenant-based rules.

Feedback can also be provided in real time back to the service provider such that real-time, dynamic modifications and changes can be implemented in the routing rules. For example, a new workload can be introduced into a cloud environment by a tenant. The workload may have parameters that cause data from a database to be routed to a virtual machine for processing according to a first path and based on the tenant-defined layer 3 overlay segment routing rules. However, after the workload starts processing, the pathway may not provide as much bandwidth as is required by a service level agreement or perhaps a node has gone down along that path in the cloud environment. Feedback can be received which causes a modification of the tenant-defined layer 3 overlay segment routing rules which will cause the data for the workload to take a different path and thus fulfill SLA or other requirements. The solution herein enables a segment routing as a service application to perform not only such defined routing on a per-tenant basis, but also further enable real-time dynamic modifications to the defined routing according to feedback.

DESCRIPTION

The present disclosure addresses the issues in the art and provides a solution using segment routing. Segment routing is defined in many different IETF drafts/RFCs (see an overview here: http://www.segment-routing.net/home/ietf). The present disclosure focuses on the implementation of segment routing in a new way "as a Service" (aaS) within a cloud environment such that it allows on-demand and per-tenant routing definitions and modifications.

Implementing segment routing as a service (SRaaS) enables an on-demand, dynamic and automated configuration of underlying segment routing environments by tenants, their applications and the service provider. The south-bound APIs provided by SRaaS allows RESTful API calls to the segment routing enabled infrastructure or alternatively a segment routing controller.

The disclosure first turns to FIG. 1 which discloses some basic hardware components that can apply to system examples of the present disclosure. Following the discussion of the basic example hardware components, the disclosure will turn to the segment routing as a service concept.

With reference to FIG. 1, an exemplary system and/or computing device 100 includes a processing unit (CPU or processor) 110 and a system bus 105 that couples various system components including the system memory 115 such as read only memory (ROM) 120 and random access memory (RAM) 125 to the processor 110. The system 100 can include a cache 112 of high-speed memory connected directly with, in close proximity to, or integrated as part of the processor 110. The system 100 copies data from the memory 115, 120, and/or 125 and/or the storage device 130 to the cache 112 for quick access by the processor 110. In this way, the cache provides a performance boost that avoids processor 110 delays while waiting for data. These and other modules can control or be configured to control the processor 110 to perform various operations or actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136 stored in storage device 130, configured to control the processor 110 as well as a special-purpose processor where software instructions are incorporated into the processor. The processor 110 may be a self-contained computing system, containing multiple cores or processors, a bus, memory controller, cache, etc. A multi-core processor may be symmetric or asymmetric. The processor 110 can include multiple processors, such as a system having multiple, physically separate processors in different sockets, or a system having multiple processor cores on a single physical chip. Similarly, the processor 110 can include multiple distributed processors located in multiple separate computing devices, but working together such as via a communications network. Multiple processors or processor cores can share resources such as memory 115 or the cache 112, or can operate using independent resources. The processor 110 can include one or more of a state machine, an application specific integrated circuit (ASIC), or a programmable gate array (PGA) including a field PGA.

The system bus 105 may be any of several types of bus structures including a memory bus or memory controller, a peripheral bus, and a local bus using any of a variety of bus architectures. A basic input/output system (BIOS) stored in ROM 120 or the like, may provide the basic routine that helps to transfer information between elements within the computing device 100, such as during start-up. The computing device 100 further includes storage devices 130 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 130 is connected to the system bus 105 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 110, bus 105, an output device such as a display 135, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the computing device 100 is a small, handheld computing device, a desktop computer, or a computer server. When the processor 110 executes instructions to perform "operations", the processor 110 can perform the operations directly and/or facilitate, direct, or cooperate with another device or component to perform the operations.

Although the exemplary embodiment(s) described herein employs a storage device such as a hard disk 130, other types of computer-readable storage devices which can store data that are accessible by a computer, such as magnetic cassettes, flash memory cards, digital versatile disks (DVDs), cartridges, random access memories (RAMs) 125, read only memory (ROM) 120, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 120 for storing software performing the operations described below, and random access memory (RAM) 125 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 110 to perform particular functions according to the programming of the module. For example, FIG. 1 illustrates three modules Mod1 132, Mod2 134 and Mod3 136 which are modules configured to control the processor 110. These modules may be stored on the storage device 130 and loaded into RAM 125 or memory 115 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 110 can include all types of processors disclosed herein, including a virtual processor. However, when referring to a virtual processor, the processor 110 includes the software components associated with executing the virtual processor in a virtualization layer and underlying hardware necessary to execute the virtualization layer. The system 100 can include a physical or virtual processor 110 that receive instructions stored in a computer-readable storage device, which cause the processor 110 to perform certain operations. When referring to a virtual processor 110, the system also includes the underlying physical hardware executing the virtual processor 110.

Figure 2:
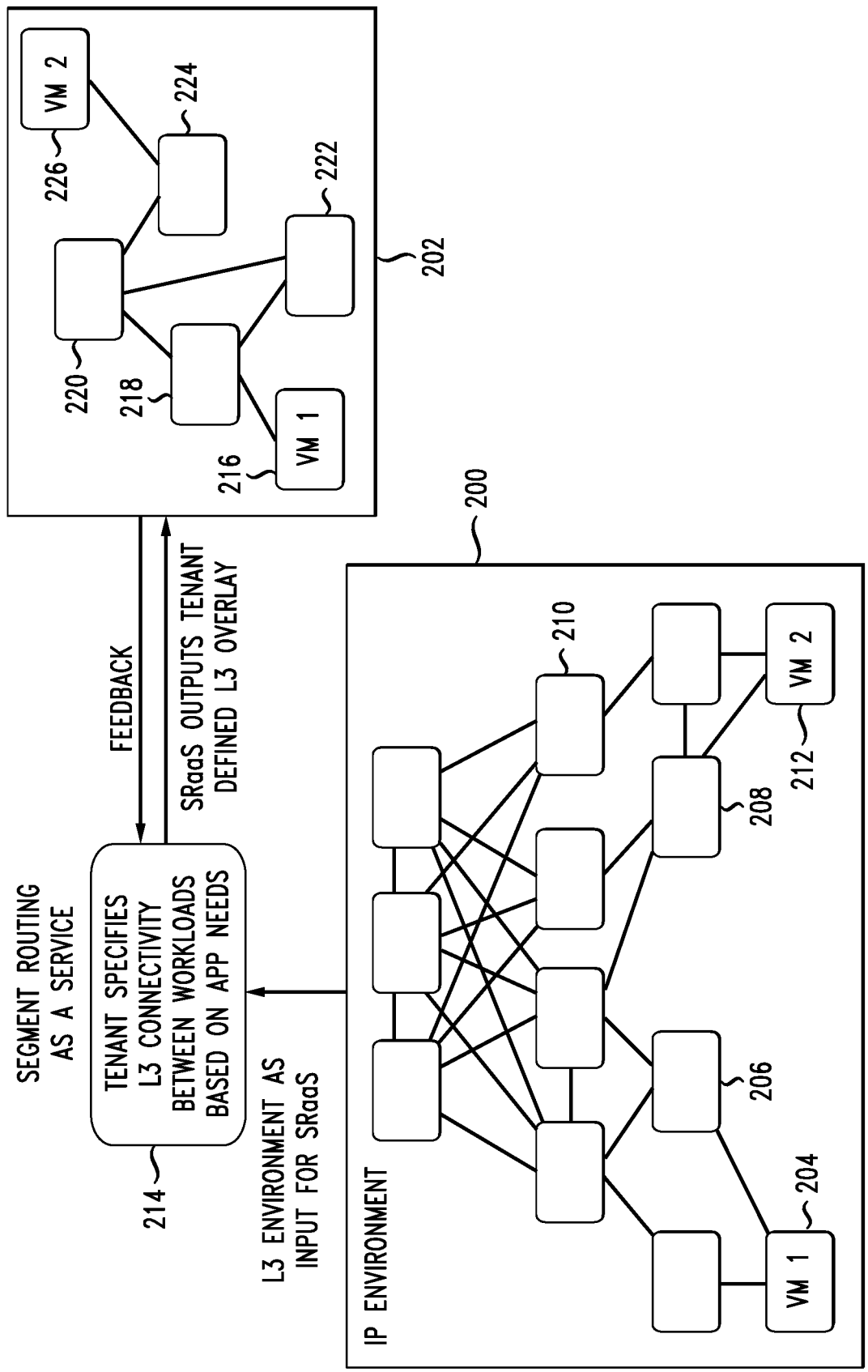
FIG. 2 illustrates the general context in which the present disclosure applies.
Figure 3:
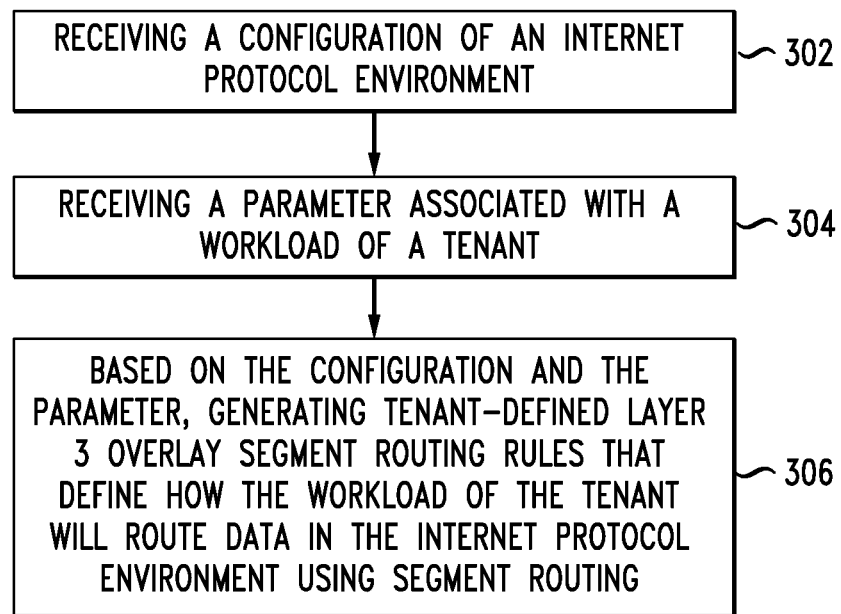
FIG. 3 illustrates an example method.

The disclosure now turns to FIGS. 2 and 3 which illustrate segment routing as a service. FIG. 2 discloses an internet protocol environment 200, a "segment routing as a service" (SRaaS) provider 214 and a representation 202 of the tenant-defined layer 3 overlay representing the internet protocol environment 200. The tenant-defined layer 3 overlay segment routing rules can be associated with a layer 3 overlay defining a second configuration 202 of the internet protocol environment 200 between the first virtual machine and the second virtual machine, or between any two nodes. The two nodes can be of different types (processor, storage, database, memory, etc.) and one can be in a cloud environment and the other may be in a separate environment.

The internet protocol environment can include various elements 206, 208, 210 which can be such entities as switches, nodes, services, and so forth, that connect a first node such as a first virtual machine 204 with a second node such as a second virtual machine 212. The internet protocol environment 200 communicates data (such as layer 3 environment data) to the SRaaS component 214. Segment routing provides the means (using the source routing paradigms) to steer traffic through a list of segments. A segment can be defined as any type of instruction including topological and/or service functions (SF). The use of the segment allows the enforcement of routes through any topological path within a network deployment. The concepts disclosed herein leverage the capabilities of segment routing and extend segment routing (both systems and method) such that cloud tenants are able to specify the topological paths dynamically and on-demand.

Normally, segment routing may be simply implemented in a compute environment by a service provider and tenants would have to have their workload managed according to the segment routing rules defined for them. However, FIG. 2 shows segment routing as a service concepts which provide the additional feature of the tenant being able to specify layer 3 connectivity for a workload. The layer 3 connectivity can include the connectivity between different workloads based on application needs. The connectivity can also be between a processing node and a storage node, or between any two disparate types of nodes or services. The segment routing as a service component 214 will receive both the data from the environment 200 and the tenant-defined data and process both sets of data to output a tenant-defined layer 3 overlay 202 for the environment 200. The overlay 202 shown by way of example in FIG. 2 illustrates the first virtual machine 216 communicating with the second virtual machine 226 with various nodes 218, 220, 222, 224 there between.

As noted above, the first virtual machine 216 and the second virtual machine 226 can also represent any to different types of nodes or entities within the environment. For example, the second virtual machine 226 may represent a database that provides data to be communicated to the first virtual machine 216 for processing or carrying out the workload running on the first virtual machine 216. The overlay environment can also provide feedback to the segment routing as a service component 214 to enable dynamic, real time modifications to routing pathway rules. Receiving feedback associated with an application of the tenant-defined layer 3 overlay segment routing rules can result in the generation of an updated version of the tenant-defined layer 3 overlay segment routing rules. The feedback can include data on bandwidth and/or throughput, jitter, latency, QoS, performance, resource consumption, uptime or responsiveness, errors, cost, packet loss, packet duplication, availability, SLA related metrics, connectivity, error rate, response time, pricing requirements, changes or rates of change on one or more of these factors within the environment and/or specifically related to the workload, etc.

In one example, assume that an application running on a virtual machine 216 needs a large amount of data from a database. In this case, a larger amount of bandwidth is needed to transport from a hardware storage endpoint. Assume in this example, that node 226 is a storage device holding a large amount of data. The database 216 could also be separate from the cloud and be part of an enterprise environment. A company might want to store its proprietary data but utilize the cloud environment for computing power. The tenant in this case may want to ensure through the data it provides to the SRaaS 214 that the routing between its database 226 and the application running in the cloud 216 is defined in a certain way. This information can be part of what is specified by the tenant to the SRaaS 214.

There are multiple aspects of the SRaaS that are contemplated, as well as various elements and benefits of the disclosure. First, SRaaS can be a way to overlay segment routing functionality 202 over any IP infrastructure 200. The concepts enable dynamic and real-time modification of the forwarding path based on application needs. The concepts disclosed herein can also maintain segment routing path definitions on a per-virtual environment basis (i.e., virtual DC—i.e., an OpenStack project).

Implementing SRaaS 214 allows tenants to define forward paths per service or application, while being able to modify these based on application needs and real time telemetry information. Tenants can leverage the APIs defined further below as a way to modify the segment routing overlay incorporating characteristics such as bandwidth, jitter, latency, pricing requirements, and/or any other metrics or factors as previously noted. These characteristics can be defined by tenant applications in advance or in real time during run-time. In other words, the feedback that is represented in FIG. 2 can include real-time or near real-time information about bandwidth usage, jitter characteristics, changes in latency, pricing requirements (now the workload is operating during a peak usage time period and the price has gone up), error rate, packet loss, cost, connectivity, response time, performance, resource utilization, packet duplication, and so forth. In addition to tenants modifying the segment routing forwarding, applications can automatically adjust the forwarding based on dynamic and on-demand requirements (telemetry based information such as utilization of network links, application peak times, etc.). The data provided through feedback can also include rates of change, such as how much bandwidth is being restricted per minute or per every five minutes, which can enable the SRaaS 214 to select a time in which to dynamically modify the overlay and adjust the segment routing of the environment 202.

An underlying IP environment 200 can be pre-configured using some Interior Gateway Protocol (IGP) protocol, such as OSPF, RIP, IS-IS, IGRP, etc. For example, Open Shortest Path First (OSPF) can be used, which is a routing protocol for Internet Protocol (IP) networks. It uses a link state routing algorithm and falls into the group of interior routing protocols, operating within a single autonomous system (AS). Segment routing 214 is then used as an overlay through the SRaaS application to define a "virtual routing topology" 202 on top of the underlying IP infrastructure 200. Note that the SRaaS application can be a module within a Software-Defined Network (SDN) environment (i.e., Open-Daylight controller, VTS, etc.).

L3 infrastructure information can be fed into the SRaaS application 214 for defining the abstracted overlay segment routing logic. Here, the L3 infrastructure information is predominantly based on the IGP details (Routing Information Base (RIB) details, link costs, other IGP metrics (depending on underlying IGP), router capabilities, shortest path to other points in infrastructure (such as network functions, i.e. firewalls), etc.) defined in the infrastructure. SRaaS 214 can make this information available for providers, tenants and applications to aid in defining the segment routing overlay forwarding based on policies and thresholds. For example, the rules may provide guidance to avoid link X in the infrastructure if cost is higher than Y. The details provided herein can use the capabilities offered by the underlying IGP protocol, such as the Enhanced Interior Gateway Routing Protocol (EIGRP) or OSPF, and may use additional means to gather further environmental details that can influence the segment routing overlay (such as resource utilization, link utilization, etc.). The EIGRP is an advanced distance-vector routing protocol that is used on a computer network for automating routing decisions and configuration. The inventors envision different types of API interfaces for SRaaS depending on the overall deployment method. These are defined in the following examples:

In a first example, the SRaaS 214 can be used as the centralized SDN controller for a full segment routing environment. In this case, the controller (SRaaS) 214 maintains the underlying segment routing topology and provides the necessary mechanisms to talk to the devices 216, 218, 220, 222, 224, 226 encompassed therein. In this scenario, the SRaaS application 214 has to have direct access to the devices to push out the segment routing rules based on tenant and/or provider 200 input. The direct access could be in the form of netconf, RESTful APIs or any other configuration protocol supported on the underlying infrastructure devices. The above approach defines the south-bound API interfaces for the SRaaS 214. North-bound, the service has to be able to receive commands from the tenants, any other application running within a tenant environment and the provider itself. The north-bound API is the same for both proposed deployments and is therefore outlined in a third example below.

In a second example, the inventors envision the deployment of the SRaaS 214 on top of an already existing segment routing environment. Here, the SRaaS 214 provides a layer between the tenant, provider application of a cloud provider and a segment routing controller. Southbound, the SRaaS application 214 provides RESTful APIs to talk to the segment routing controller (for example OPENDAYLIGHT or ONOS, etc.). The inventors believe this can be advantageous as segment routing deployments can be deployed independently of cloud environments and therefore might not rely on SRaaS 214 as the centralized controller but rather have an independent controller for broader purposes. As mentioned in the first example above, the north-bound APIs can be the same in both scenarios. In the third example below, north-bound API support is envisioned.

In the third example, the inventors envision the SRaaS 214 providing a north-bound API for tenants, their applications and providers to leverage the functionality of SRaaS 214. The API is rich enough to allow a tenant and its application to either manually (the tenant administrator for example) or automatically (the tenant application) to send and receive API requests from the SRaaS 214 to define the underlying segment routing environment based on their specific needs. For example, the application may need a large amount of data retrieved from a database and thus need at an initialization stage a large amount of bandwidth, after which the bandwidth requirement diminishes. Here, the API may support tenant and tenant application separation to distinguish RESTful API calls. A tenant could, for example, define boundaries in the segment routing environment such that its application can automatically define routes based on its own requirements. The application should be able to access a set of API calls allowing the definition of forwarding rules to build the segment routing based table from its origin to destination. The provider can use the north-bound APIs to administratively define environmental settings (tenant privileges, SR configuration parameters, SR link characteristics, etc.).

Based on the above examples, the SRaaS 214 can maintain a local database for the configurations done by the tenant, its application and/or the providers. This is valuable to maintain a sync-able state between the SRaaS 214 and the underlying segment routing environment in case of a failure.

In another aspect, the inventors propose the usage of pricing details within the SRaaS application 214. The pricing could be used by the provider and the tenant to base their segment routing forwarding definition on price related information. Here, a provider could, for example, define certain price details for certain links or forwarding rules. The tenant, defining the segment routing based overlay, can use the information to dynamically and on-demand modify forwarding decisions based on pricing provided. For example, if a higher bandwidth is needed for an application, the tenant can see the pricing for the increased bandwidth and in an on-demand manner, modify the forwarding decisions and pay that price for the enhanced service. This will enrich both the SRaaS application 214 itself but also provides flexibility to both the cloud provider and the tenants and allow for dynamically and very customizable adjustments to the segment routing overlay. Such decisions may also be governed by service level agreements for the tenant and service level agreements or policies governing the cloud environment.

FIG. 3 illustrates a method example. In this example, the SRaaS 214 is the entity that is performing the steps outlined in FIG. 3. However, other examples could include the IP environment 200 also performing the steps or complimentary steps. The method includes receiving a configuration of an internet protocol environment (302), such as IP environment 200. The configuration can include the layer 3 environment in a cloud provider or can include data across multiple cloud providers. The information provided can be dynamically adjusted based on current needs and available resources. The configuration defines the routing, forwarding, and/or paths used for two different nodes or entities 204, 212 to communicate. As a first entity 204 and a second entity 212 communicate, network issues such as latency, jitter, bandwidth or throughput issues, packet loss, connectivity issues, etc., can affect the quality and efficiency of the communication. The configuration can be any data that defines or characterizes the forwarding between node 204 and node 212. Based on that input to the SRaaS 214, the system defines the forwarding paths. The tenant who desires to have workload processed in the environment 200 can provide data and provide an optimal of preferred path that the application will need to send data from node 216 to node 226 (which correspond respectively to node 204 and 212).

Next, the method includes receiving a parameter associated with a workload of a tenant (304). In this example, the tenant can provide data or requirements such as its workload should have the best path to meet a certain requirement. The tenant could rely on the standard routing algorithms which can provide a potentially best route or pathway. The tenant can provide service level agreement (SLA) requirements which can automatically require a "best service" or other criteria. Thus, the tenant specifies specific parameters/SLA requirements/general requirements, etc., that the SRaaS 214 uses to define routing rules according to segment routing principles.

The method includes, based on the configuration and the parameter, generating tenant-defined layer 3 overlay segment routing rules that define how the workload of the tenant will route data in the internet protocol environment using segment routing (306). The SRaaS 214 defines what paths meet the requirement in segment routing. This approach allows for a software-defined network to manage segment routing so it can modify the forwarding of data based on various criteria. The resulting tenant-defined layer 3 overlay can choose the pathway between node 216 and node 226. The result is the ability to implement per tenant or a per application/workload routing definition. The cloud service provider can also provide the routing definition, or in the alternative, the cloud service provider and the tenant can jointly define the routing definition by each providing, for example, requirement parameters and optional parameters and the SRaaS 214 can negotiate the various requirements and output the partially provider defined and partially tenant defined layer 3 overlay 202.

In one example of the concepts disclosed herein, assume an optimal path is identified between node 216 and 226. However, the path at some point fails to provide the best throughput because peak usage of the compute environment is currently happening. The load is high, and the tenant or application should adjust the routing environment while taking into account something else or other environment characteristics. The system provides for feedback to the SRaaS 214 to enable such timing-based dynamic changes to the layer 3 overlay. In such cases, the SRaaS 214 can dynamically adjust the tenant-defined layer 3 overlay and thus change the routing rules and/or forwarding paths. In another example, there can be a degradation of the compute environment in some areas, this can also cause the system to re-route or revise the protocol and avoid the problem regions.

The present disclosure provides a novel feature of establishing and modifying, in real-time and optionally based on certain thresholds such as certain levels of utilization and using the SRaaS 214, the layer 3 overlay used for segment routing. Generating the tenant-define layer 3 overlay segment rules may replace existing segment routing rules. This approach gives tenants more control of how their workload is processed. In one aspect, this approach does not require nor care about the particular IP configuration 200, as the segment routing can control the routing requirements. Thus, if the cloud environment available to the tenant is a connected cloud A and cloud B, or some other type of environment that the system provides to the tenant, it will not matter in that the tenant can specify and communicate its requirements and thresholds to the SRaaS 214. The system may require an extra cost for the ability of the tenant to provide their parameters and access the dynamic, real-time modification feature of the SRaaS 214.

The configuration of environment 200 can be generated using an interior gateway protocol and represents a layer 3 environment. The interior gateway protocol can provide RIB details, link costs, metrics, router capability, shortest path to infrastructure points, etc. The parameter provided to SRaaS 214 by the tenant can include one or more of a tenant-defined layer 3 connectivity, a service level agreement, a specific resource capability, a per-application parameter, a timing parameter, a cost parameter, etc.

The present examples are to be considered as illustrative and not restrictive, and the examples is not to be limited to the details given herein, but may be modified within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. In a multi-tenant internet protocol (IP) network environment supporting a segment-routing overlay, a method of allowing a tenant to dynamically cause a change in segment-routing topology, the method comprising:
receiving a configuration of an IP network environment;
receiving one or more parameters associated with an application of a tenant;
based on the configuration and the one or more parameters, generating segment routing rules for forwarding data for the application in a multi-tenant environment;

receiving an update to the one or more parameters associated with the application of the tenant;
collecting telemetry data associated with forwarding data for the application using the segment routing rules;
responsive to the telemetry data, dynamically changing the segment routing rules for forwarding data of the application;
responsive to the one or more updated parameters, dynamically changing the segment routing rules for forwarding data of the application; and
causing the IP network environment to initiate a change from a first segment-routed topology to a second segment-routed topology, wherein the second segment routed topology implements the dynamically changed segment routing rules for forwarding data of the application.

2. The method of claim 1, wherein the update conforms to privileges of the tenant.

3. The method of claim 1 further comprising:
receiving, at a network element, a communication initiating the change from the first segment-routed topology to the second segment-routed topology;
implementing the second segment-routed topology in the network element;
propagating the second segment-routed topology in the IP network environment; and
steering network traffic of the application according to the second segment-routing topology.

4. The method of claim 3, wherein propagating the segment-routed topology uses an interior gateway protocol.

5. The method of claim 1, further comprising:
gathering information on configuration of the IP network environment through use of an interior gateway protocol.

6. The method of claim 1, further comprising the step of communicating feedback to the application based on the collected telemetry data.

7. The method of claim 1 wherein the second segment-routed topology includes a service function.

8. The method of claim 1 wherein the one or more parameters associated with the application of the tenant include at least one of a cost parameter and a pricing parameter.

9. The method of claim 1 wherein the telemetry data includes at least one of cost data and pricing data.

10. In a multi-tenant internet protocol (IP) network environment supporting a segment-routing overlay, a system that allows a tenant to dynamically cause a change in segment-routing topology, the system comprising:
one or more processors; and
a computer-readable medium, storing instructions which, when executed by the one or more processors, cause the one or more processors to:
receive a configuration of an IP network environment;
receive one or more parameters associated with an application of a tenant;
based on the configuration and the one or more parameters, generate segment routing rules for forwarding data for the application in a multi-tenant environment;
receive an update to the one or more parameters associated with the application of the tenant;
collect telemetry data associated with forwarding data for the application using the segment routing rules;
responsive to the telemetry data, dynamically change the segment routing rules for forwarding data of the application;
responsive to the one or more updated parameters, dynamically change the segment routing rules for forwarding data of the application; and
cause the IP network environment to initiate a change from a first segment-routed topology to a second segment-routed topology, wherein the second segment routed topology implements the dynamically changed segment routing rules for forwarding data of the application.

11. The system of claim 10, wherein the update conforms to privileges of the tenant.

12. The system of claim 10, further comprising:
one or more of the processors being caused to:
receive at a network element a communication initiating the change from the first segment-routed topology to the second segment-routed topology;
implement the second segment-routed topology in the network element;
propagate the second segment-routed topology in the IP network; and
steer network traffic of the application according to the second segment-routing topology.

13. The system of claim 12, wherein propagation of the segment-routed topology uses an interior gateway protocol.

14. The system of claim 10, further comprising:
one or more of the processors being caused to:
gather information on configuration of the IP network environment through use of an interior gateway protocol.

15. The system of claim 10, further comprising
one or more of the processors being caused to:
communicate feedback to the application based on the collected telemetry data.

16. The system of claim 10, wherein the second segment-routed topology includes a service function.

17. The system of claim 10, wherein the one or more parameters associated with the application of the tenant least one of a cost parameter and a pricing parameter.

18. The system of claim 10, wherein the telemetry data includes at least one of cost data and pricing data.

19. In a multi-tenant internet protocol (IP) network environment supporting a segment-routing overlay, a non-transitory computer-readable medium storing instructions which, when executed by one or more processors, cause the one or more processors to allow a tenant to dynamically cause a change in segment-routing topology, the instructions comprising:
receive a configuration of an IP network environment;
receive one or more parameters associated with an application of a tenant;
based on the configuration and the one or more parameters, generate segment routing rules for forwarding data for the application in a multi-tenant environment;
receive an update to the one or more parameters associated with the application of the tenant, the update conforming to privileges of the tenant;
collect telemetry data associated with forwarding data for the application using the segment routing rules;
responsive to the telemetry data, dynamically change the segment routing rules for forwarding data of the application;
responsive to the one or more updated parameters, dynamically change the segment routing rules for forwarding data of the application; and
cause the IP network environment to initiate a change from a first segment-routed topology to a second segment-routed topology, wherein the second segment routed topology implements the dynamically changed segment routing rules for forwarding data of the application.

20. The instructions of claim 19, wherein the update conforms to privileges of the tenant.

21. In a multi-tenant internet protocol (IP) network environment supporting a segment-routing overlay, a method of allowing a tenant to dynamically cause a change in segment-routing topology, the method comprising:
receiving a configuration of an IP network environment;
receiving one or more parameters associated with an application of a tenant;
based on the configuration and the one or more parameters, generating segment routing rules for forwarding data for the application in a multi-tenant environment;
receiving an update to the one or more parameters associated with the application of the tenant, the update conforming to privileges of the tenant;
collecting telemetry data associated with forwarding data for the application using the segment routing rules;
dynamically changing the segment routing rules for forwarding data of the application; and
causing the IP network environment to initiate a change from a first segment-routed topology to a second segment-routed topology, wherein the second segment routed topology implements the dynamically changed segment routing rules for forwarding data of the application.

22. The method of claim 21, wherein the update conforms to privileges of the tenant.

23. The method of claim 21, wherein the dynamic changing of segment routing rules is responsive to telemetry data.

24. The method of claim 21, wherein the dynamic changing of segment routing rules is responsive to the one or more updated parameters.

25. The method of claim 21, wherein the dynamic changing of segment routing rules is responsive to telemetry data and is responsive to the one or more updated parameters.

26. The method of claim 21, further comprising:
receiving at a network element a communication initiating the change from the first segment-routed topology to the second segment-routed topology;
implementing the second segment-routed topology in the network element;
propagating the second segment-routed topology in the IP network; and
steer network traffic of the application according to the second segment-routing topology.

27. The method of claim 26, wherein propagating the segment-routed topology uses an interior gateway protocol.

28. The method of claim 21, further comprising:
gathering information on configuration of the IP network environment through use of an interior gateway protocol.

29. The method of claim 21, further comprising the step of communicating feedback to the application based on the collected telemetry data.

30. The method of claim 21 wherein the second segment-routed topology includes a service function.

31. The method of claim 21, wherein the one or more parameters associated with the application of the tenant include at least one of a cost parameter and a pricing parameter.

32. The method of claim 21, wherein the telemetry data includes at least one of cost data and pricing data.

33. In a multi-tenant internet protocol (IP) network environment supporting a segment-routing overlay, a system that allows a tenant to dynamically cause a change in segment-routing topology, the system comprising:
one or more processors; and
a computer-readable medium, storing instructions which, when executed by the one or more processors, cause the one or more processors to:
receive a configuration of an IP network environment;
receive one or more parameters associated with an application of a tenant;
based on the configuration and the one or more parameters, generate segment routing rules for forwarding data for the application in a multi-tenant environment;
receive an update to the one or more parameters associated with the application of the tenant, the update conforming to privileges of the tenant;
collect telemetry data associated with forwarding data for the application using the segment routing rules;
dynamically change the segment routing rules for forwarding data of the application; and
cause the IP network environment to initiate a change from a first segment-routed topology to a second segment-routed topology, wherein the second segment routed topology implements the dynamically changed segment routing rules for forwarding data of the application.

34. The system of claim 33, wherein the update conforms to privileges of the tenant.

35. The system of claim 33, wherein the dynamic change of segment routing rules is responsive to the telemetry data.

36. The system of claim 33, wherein the dynamic change of segment routing rules is responsive to the one or more updated parameters.

37. The system of claim 33, wherein the dynamic change of segment routing rules is responsive to telemetry data and is responsive to the one or more updated parameters.

38. The system of claim 33, further comprising:
one or more of the processors being caused to:
receive at a network element a communication initiating the change from the first segment-routed topology to the second segment-routed topology;
implement the second segment-routed topology in the network element;
propagate the second segment-routed topology in the IP network; and
steer network traffic of the application according to the second segment-routing topology.

39. The system of claim 38, wherein propagation of the segment-routed topology uses an interior gateway protocol.

40. The system of claim 33, further comprising:
one or more of the processors being caused to:
gather information on configuration of the IP network environment through use of an interior gateway protocol.

41. The system of claim 33, further comprising:
one or more of the processors being caused to:
communicate feedback to the application based on the collected telemetry data.

42. The system of claim 33, wherein the second segment-routed topology includes a service function.

43. The system of claim 33, wherein the one or more parameters associated with the application of the tenant least one of a cost parameter and a pricing parameter.

44. The system of claim 33, wherein the telemetry data includes at least one of cost data and pricing data.

45. In a multi-tenant internet protocol (IP) network environment supporting a segment-routing overlay, a non-transitory computer-readable medium storing instructions which, when executed by one or more processors, cause the one or more processors to allow a tenant to dynamically cause a change in segment-routing topology, the instructions comprising:

receive a configuration of an IP network environment;

receive one or more parameters associated with an application of a tenant;

based on the configuration and the one or more parameters, generate segment routing rules for forwarding data for the application in a multi-tenant environment;

receive an update to the one or more parameters associated with the application of the tenant, the update conforming to privileges of the tenant;

collect telemetry data associated with forwarding data for the application using the segment routing rules;

dynamically change the segment routing rules for forwarding data of the application; and cause the IP network environment to initiate a change from a first segment-routed topology to a second segment-routed topology, wherein the second segment routed topology implements the dynamically changed segment routing rules for forwarding data of the application.

46. The instructions of claim 45, wherein the update conforms to privileges of the tenant.

47. The instructions of claim 45 wherein the dynamic change of segment routing rules is responsive to the telemetry data.

48. The instructions of claim 45 wherein the dynamic change of segment routing rules is responsive to the one or more updated parameters.

49. The instructions of claim 45 wherein the dynamic change of segment routing rules is responsive to telemetry data and is responsive to the one or more updated parameters.

* * * * *